US012506240B2

(12) United States Patent
Daugherty et al.

(10) Patent No.: US 12,506,240 B2
(45) Date of Patent: Dec. 23, 2025

(54) PASSIVE ELECTROMAGNETIC WAVEGUIDES AND WAVEGUIDE COMPONENTS, AND METHODS OF FABRICATION AND MANUFACTURE

(71) Applicant: Elve Inc., Davis, CA (US)

(72) Inventors: Diana Gamzina Daugherty, Davis, CA (US); Mikhail Kuffel, Sacramento, CA (US); Blake Joseph Griffin, Seattle, WA (US); Richard Kowalczyk, Redwood City, CA (US)

(73) Assignee: Elve Inc., Davis, CA (US)

( * ) Notice: Subject to any disclaimer, the term of this patent is extended or adjusted under 35 U.S.C. 154(b) by 171 days.

(21) Appl. No.: 18/370,174

(22) Filed: Sep. 19, 2023

(65) Prior Publication Data

US 2024/0097305 A1 Mar. 21, 2024

Related U.S. Application Data

(60) Provisional application No. 63/407,879, filed on Sep. 19, 2022.

(51) Int. Cl.

| | |
|---|---|
| ***H01P 3/12*** | (2006.01) |
| ***H01P 1/18*** | (2006.01) |
| ***H01P 1/20*** | (2006.01) |
| ***H01P 1/38*** | (2006.01) |
| ***H01P 5/00*** | (2006.01) |

(52) U.S. Cl.

CPC .................. *H01P 3/12* (2013.01); *H01P 1/18* (2013.01); *H01P 1/20* (2013.01); *H01P 1/38* (2013.01); *H01P 5/00* (2013.01)

(58) Field of Classification Search

CPC ...... H01P 3/12; H01P 1/18; H01P 1/20; H01P 1/38; H01P 5/00; H01P 11/002

USPC ...... 333/22 R, 157, 208, 239, 248, 251, 211, 333/249, 254, 255, 21 A, 34

See application file for complete search history.

(56) References Cited

U.S. PATENT DOCUMENTS

| | | | |
|---|---|---|---|
| 7,864,532 B1 | 1/2011 | Ehret et al. | |
| 2004/0252938 A1 | 12/2004 | Ducellier et al. | |
| 2010/0164654 A1 | 7/2010 | Fujii | |
| 2014/0170993 A1 | 6/2014 | Pescod et al. | |
| 2014/0197904 A1 | 7/2014 | Brown et al. | |
| 2016/0268665 A1 | 9/2016 | Sherrer et al. | |
| 2017/0045065 A1 | 2/2017 | Jung-Kubiak et al. | |
| 2018/0138987 A1* | 5/2018 | Sliwa | H03D 7/005 |
| 2018/0269557 A1 | 9/2018 | Fangfang et al. | |
| 2019/0099218 A1 | 4/2019 | Hancock et al. | |
| 2019/0267690 A1* | 8/2019 | Vaughn | H01P 1/182 |
| 2020/0102213 A1 | 4/2020 | Haridas et al. | |
| 2021/0392419 A1 | 12/2021 | Meister et al. | |

* cited by examiner

*Primary Examiner* — Jorge L Salazar, Jr.

(74) *Attorney, Agent, or Firm* — Sheppard Mullin Richter & Hampton LLP

(57) ABSTRACT

An electromagnetic waveguide component includes multiple planar layers and one or more layers are shaped to accommodate incoming electromagnetic waves. Each layer includes two more alignment features, and corresponding pins, the two or more alignment features in each of the layers providing precise stacking registration among the plurality of layers, and the planar layers, when assembled into a stack, are configured to provide a desired radio frequency (RF) response.

19 Claims, 14 Drawing Sheets

PASSIVE ELECTROMAGNETIC WAVEGUIDES AND WAVEGUIDE COMPONENTS, AND METHODS OF FABRICATION AND MANUFACTURE

PRIORITY CLAIM

This application claims benefit of and hereby incorporates by reference provisional patent application Ser. No. 63/407,879, entitled "Passive Electromagnetic Wave Guides and Wave Guide components and Methods for Their Manufacture and Fabrication," filed on Sep. 19, 2022, by inventors Daugherty et al.

BACKGROUND

Passive electromagnetic wave components such as waveguides are used to transmit and manipulate electromagnetic fields without a separate energy source. Construction of passive electromagnetic wave components may require incorporation of metallic, ceramic (including lossy ceramic), plastic, and specialized magnetic components into a single assembly. Passive electromagnetic wave components include but are not limited to straight waveguide sections; waveguide bends; waveguide transitions from one size to another size; waveguide transitions from one mode to another mode; couplers, splitters or joiners; multiplexers; filters; equalizers; waveguide to coax adaptors, terminations or loads; some phase shifters, isolators and circulators, unbiased diodes, and some antennas.

The size and/or dimension of passive electromagnetic wave component features depends on the frequency or frequencies of electromagnetic waves the component is designed to handle. Fabrication of a passive electromagnetic wave component requires the geometry to be accurate to a small fraction of the wavelength. At higher frequencies, the required accuracy can be a challenge to achieve using conventional machining and often involves a slow and expensive process. For high frequencies, semiconductor lithography techniques can produce passive electromagnetic wave components at low cost, but only with large up-front investment in tooling and process development. Additive manufacturing provides a flexible approach, but often does not produce passive electromagnetic wave components that have the same quality as would be obtained machining from a solid billet of material. For example, the bulk conductivity of the material used in a passive electromagnetic wave component affects its performance. Conventional additive fabrication techniques may result in a lower conductivity, which in turn will result in increased electromagnetic wave energy loss. Additionally, thermal conductivity and mechanical strength may be affected by porosity, inclusions and contamination when using conventional additive fabrication techniques.

SUMMARY

Disclosed herein are example designs, techniques, and processes for fabricating passive electromagnetic wave components. In some embodiments, the designs, techniques, and processes achieve accurate dimensions and small feature sizes with high conductivity and high manufacturing flexibility. In some embodiments, the techniques and processes disclosed herein are especially beneficial for fabrication of millimeter wave components when the wavelength is between one centimeter and one millimeter (approximately 30 GHz through 300 GHz). Herein, the term "waveguide" is intended to refer to any passive electromagnetic wave component.

The various embodiments of the present invention use layered fabrication designs, techniques and processes. In some embodiments, multiple planar layers are fabricated and assembled to form precise, high conductivity waveguide structures through a low cost and rapid process compared to current fabrication processes. The multiple layers may include conductive and/or non-conductive materials, e.g., dielectric or ferrite elements. The multiple layers may include alignment features that ensure accurate and low-cost assembly of layers into a monolithic waveguide component. In some embodiments, because of the alignment features, the assembled monolithic waveguide component may be disassembled and reassembled with no loss of performance, thereby allowing replacement of a layer, multiple layers and/or specific elements in a layer. Although each of the layers are shown as planar, the layers need not be planar.

Layers may be bonded together to form a high-strength assembly with minimal gaps or discontinuities between layers. When bonding layers together, any of brazing, diffusion bonding, assisted diffusion bonding, solid state bonding, cold welding, ultrasonic welding, a combination of one or more of the foregoing, and/or the like may be used. In some embodiments, bonding may be carried out in a non-reactive environment such as hydrogen, nitrogen, vacuum and/or the like.

Prior to bonding, respective layers may be cleaned, plasma etched, or otherwise treated to remove contaminants and any surface oxide layer, and maintained in a vacuum or inert gas environment to assist in the formation of a leak-tight bond. Respective layers may be coated (e.g., sputtered, electroplated, metallized and/or painted) with materials to assist in producing a gap-free and void-free joint between respective layers (which may be made of dissimilar materials). The coatings may include one or more of nickel, gold, silver, molybdenum-manganese, copper, copper-gold, copper-silver, titanium-nickel, gold-copper-titanium, copper-silver-titanium, copper-silver-titanium-aluminum, titanium-nickel-copper, gold-copper-titanium-aluminum, silver-copper-indium-titanium, copper-germanium, palladium-nickel-copper-silver, gold-palladium-manganese, silver-palladium, gold-copper-nickel, gold-copper-indium, silver-copper-indium, gold-nickel, gold-nickel-chromium, and/or the like.

The joints formed between adjacent layers can be hermetic, especially for situations in which the interior is to be evacuated to a vacuum or pressurized with a gas, as is often done to reduce the likelihood of radio frequency (RF) breakdown events during use. At millimeter wave frequencies, waveguides are especially sensitive to small gaps, which can cause absorptive loss and reflection of the RF signal or can provide an undesired modification of the RF characteristics, such as resonant frequency or filter frequency. Reduction of gaps and discontinuities results in relatively high power-handling capability and high gradient capability. The layered fabrication designs, techniques and processes are especially well suited for devices from 30 GHz to 300 GHz, but can be used for devices below 30 GHz and above 300 GHz.

Most of the layered fabrication designs, techniques and processes disclosed herein can be used in any of the embodiments disclosed herein. Each embodiment disclosed herein is being presented to teach additional designs, techniques and processes that can be used in any other embodiment.

In accordance with some embodiments, the present invention provides an electromagnetic waveguide component, comprising a plurality of planar layers comprising: one or more layers shaped to accommodate at least a portion of a waveguide channel configured to transmit or manipulate an electromagnetic wave and configured to provide a desired radio frequency (RF) response; one or more alignment features formed in each of the plurality of layers, the one or more alignment features in each of the plurality of layers configured to provide precise stacking registration among the plurality of planar layers, the one or more alignment features configured to cooperate with corresponding pins; and the plurality of planar layers when assembled into a stack configured to form the waveguide channel.

One or more of the plurality of planar layers may comprise a conductive material and a non-conductive material. One or more of the plurality of planar layers may comprise a ferrite material. The plurality of planar layers may be bonded together to create seals hermetic to electromagnetic waves such that any loss and mismatch of the electromagnetic waves correspond to that achieved from a solid piece of material. The plurality of planar layers may be made of copper, aluminum, titanium, tungsten, iron, nickel, cupronickel, stainless steel, carbon steel, alloy steel, tool steel, iron-oxide based ferromagnetic materials, copper alloys, dispersion hardened copper, aluminum alloys or any combination thereof. The plurality of layers may be made of multiple materials, including one or more of lossy dielectrics, non-lossy dielectrics, insulators, ferromagnetic materials, diamagnetic materials, and electrets. The electromagnetic waveguide component may be a waveguide distribution assembly, routing one or more waveguide channels from an input port to an output port. The electromagnetic waveguide component may be a waveguide distribution assembly, routing one or more waveguide channels from an input port to an output port and providing a coupler on one or more of the waveguide paths providing, at a coupled port, a portion of the signal in one of the one or more waveguide channels. The electromagnetic waveguide component may be a coupler, a phase shifter, a circulator, a load, or a filter. The electromagnetic waveguide component may provide waveguide routing and coupling to one or more additional electromagnetic waveguide components. The one or more alignment features may include alignment features of different types. A planar layer may be separated into at least two sections, and each of the sections may include at least one alignment feature. Each of the plurality of planar layers may include at least two alignment features. A waveguide channel may be routed up or down different planar layers. A waveguide channel may pass over or under a different waveguide channel. At least one of the plurality of planar layers may be formed thereon at least one removable support.

DETAILED DESCRIPTION

Figure 1A:
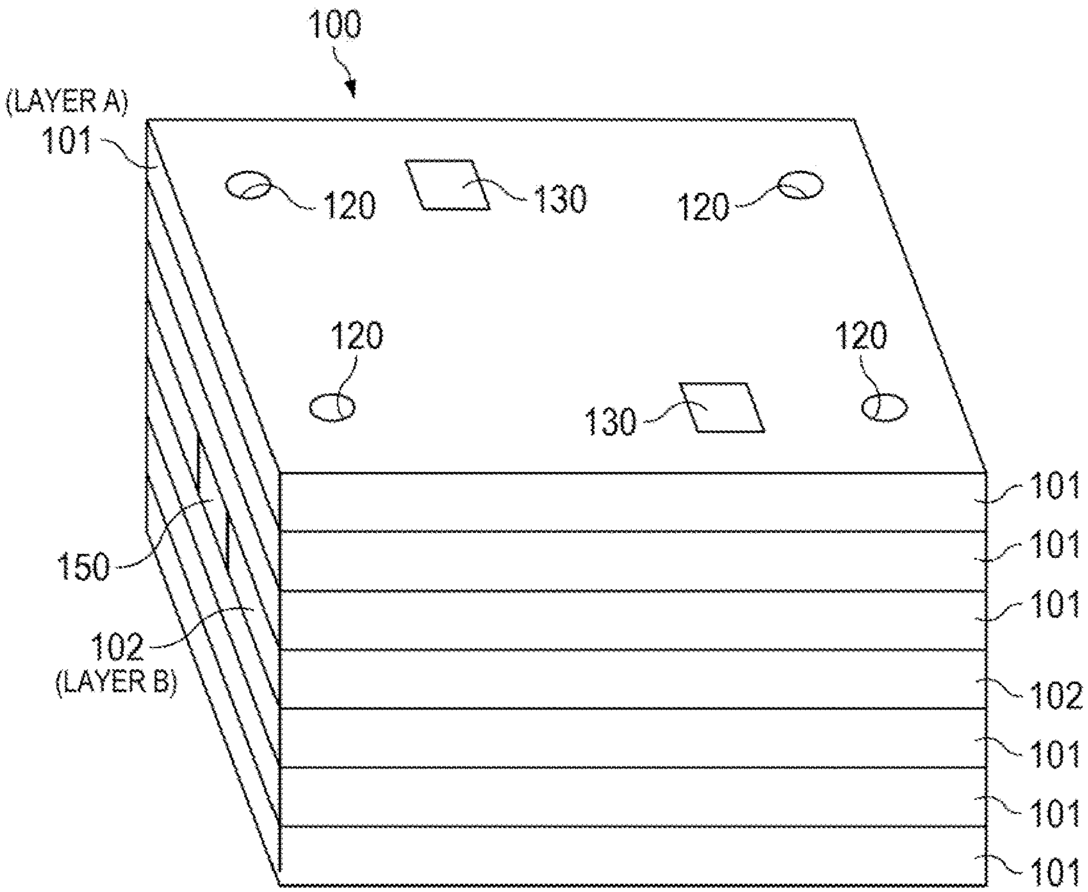
FIGS. 1A-1C illustrate an example passive waveguide component made using layered fabrication designs, techniques and processes, in accordance with some embodiments of the present invention.

Disclosed herein are example designs, techniques, and processes for fabricating passive electromagnetic wave components. In some embodiments, the designs, techniques, and processes achieve accurate dimensions and small feature sizes with high conductivity and high manufacturing flexibility. In some embodiments, the techniques and processes disclosed herein are especially beneficial for fabrication of millimeter wave components when the wavelength is between one centimeter and one millimeter (approximately 30 GHz through 300 GHz). Herein, the term "waveguide" is intended to refer to any passive electromagnetic wave component.

The various embodiments of the present invention use layered fabrication designs, techniques and processes. In some embodiments, multiple planar layers are fabricated and assembled to form precise, high conductivity waveguide structures through a low cost and rapid process compared to current fabrication processes. The multiple layers may include conductive and/or non-conductive materials, e.g., ferrite elements. The multiple layers may include alignment features that ensure accurate and low-cost assembly of layers into a monolithic waveguide component. In some embodiments, because of the alignment features, the assembled monolithic waveguide component may be disassembled and reassembled with no loss of performance, thereby allowing replacement of a layer, multiple layers and/or specific elements in a layer. Although each of the layers are shown as planar, the layers need not be planar.

Layers may be bonded together to form a high-strength assembly with minimal gaps or discontinuities between layers. When bonding layers together, any of brazing, diffusion bonding, assisted diffusion bonding, solid state bonding, cold welding, ultrasonic welding, a combination of one or more of the foregoing, and/or the like may be used. In some embodiments, bonding may be carried out in a non-reactive environment such as hydrogen, nitrogen, vacuum and/or the like.

Prior to bonding, respective layers may be cleaned, plasma etched, or otherwise treated to remove contaminants and any surface oxide layer, and maintained in a vacuum or inert gas environment to assist in the formation of a leak-tight bond. Respective layers may be coated (e.g., sputtered, electroplated, metallized and/or painted) with materials to assist in producing a gap-free and void-free joint between respective layers (which may be made of dissimilar materials). The coatings may include one or more of nickel, gold, silver, molybdenum-manganese, copper, copper-gold, copper-silver, titanium-nickel, gold-copper-titanium, copper-silver-titanium, copper-silver-titanium-aluminum, titanium-nickel-copper, gold-copper-titanium-aluminum, silver-copper-indium-titanium, copper-germanium, palladium-nickel-copper-silver, gold-palladium-manganese, silver-palladium, gold-copper-nickel, gold-copper-indium, silver-copper-indium, gold-nickel, gold-nickel-chromium, and/or the like.

The joints formed between adjacent layers can be hermetic, especially for situations in which the interior is to be evacuated to a vacuum or pressurized with a gas, as is often done to reduce the likelihood of radio frequency (RF) breakdown events during use. At millimeter wave frequencies, waveguides are especially sensitive to small gaps, which can cause absorptive loss and reflection of the RF signal or can provide an undesired modification of the RF characteristics, such as resonant frequency or filter frequency. Reduction of gaps and discontinuities results in relatively high power-handling capability and high gradient capability. The layered fabrication designs, techniques and processes are especially well suited for devices from 30 GHz to 300 GHz, but can be used for devices below 30 GHz and above 300 GHz.

Most of the layered fabrication designs, techniques and processes disclosed herein can be used in any of the embodiments disclosed herein. Each embodiment disclosed herein is being presented to teach additional designs, techniques and processes that can be used in any other embodiment.

Figure 1B:
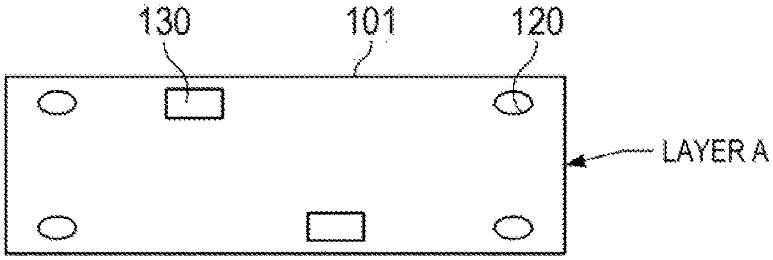
Figure 1C:
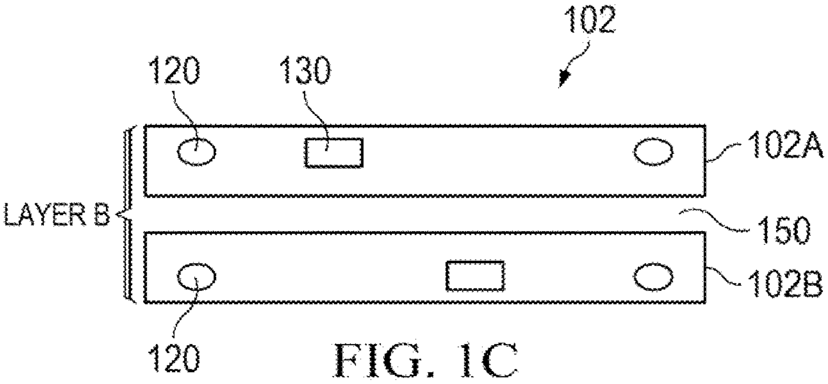

FIGS. 1A-1C illustrate an example passive waveguide component 100 made using layered fabrication designs, techniques and processes, in accordance with some embodiments of the present invention. FIG. 1A illustrates an isometric view of the waveguide component 100. As can be seen, waveguide component 100 includes seven layers: six non-channel layers 101 sandwiching channel layer 102. The non-channel layers 101 and channel layer 102 may be formed of any suitable waveguide material, and may be designed for handling electromagnetic waves in the frequency range of approximately 30 GHz to 300 GHz or alternatively other frequency ranges. The non-channel layers 101 and channel layer 102 may comprise conductive or non-conductive materials.

The non-channel layers 101 (layers A) and channel layer 102 (layer B) may be fabricated and then stacked to form the passive waveguide component 100. Fabrication of the non-channel layers 101 and channel layer 102 may include milling, drilling, or otherwise forming alignment features 120. As shown in FIGS. 1A-1C, in some embodiments, the alignment features 120 may be round and may be positioned in the corners of each layer 101 and 102. Although the alignment features 120 are shown as round, other shapes are possible. Although the alignment features 120 are shown positioned in the corners, other positions are possible. Although the layers are shown as including multiple alignment features, a layer 101 or 102 may include only one alignment feature 120. In some embodiments, a layer 101 or 102 may include two or more alignment features 120. In some embodiments, the multiple alignment features 120 may include differently shaped alignment features or different types of alignment features. For layers having disconnected sections (e.g., the layer 102 shown in FIG. 1C), one or more alignment features 120 may be positioned on each section. As shown in FIG. 1C, channel layer 102 may be divided into two sections 102A and 102B, and each section 102A and 102B includes two alignment features 120.

In some embodiments, the alignment features 120 may align through the stacked layers 101 and 102. In some embodiments, each layer 101 and 102 may have alignment features 130 of a second shape in addition to alignment features 120 of a first shape. For example, the alignment features 120 may include round features and the additional alignment features 130 may include rectangular (including square) features configured to provide greater assurance of precise layer alignment. Unlike a single round alignment feature 120, a single rectangular alignment feature 130 controls layer rotation in addition to layer position. Other shapes (such as triangular, pentagonal, star, etc.) may also control layer rotation. Multiple rectangular alignment features 130 provide further assurances of proper positioning and rotation prevention. In some embodiments, alignment features 120 or 130 may include holes configured to receive alignment pins (not shown) of substantially similar shape therein. The alignment features 120 or 130 may include a bore partially or entirely through a layer. Alignment features 120 may include alignment features 130.

Layer 102 may be fabricated as two separate sections or by removal of section 150 from a "solid" layer, thereby leaving sections 102A and 102B remaining after removal. In some embodiments, a "solid" layer may have non-channel portions removed such as for alignment features 120. The removed section 150 forms the waveguide channel upon assembly of the layers of the waveguide component 100. Layer 102 (layer B) may have a thickness equal to the desired interior waveguide channel height. In some embodiment, layer 102 may include multiple identical layers of reduced thickness, such that the total thickness of the layers form the waveguide height. Sections 102A and 102B may be separated by a distance equal to the desired interior waveguide channel width.

During assembly, the layers 101 and 102 may be secured, e.g., bonded together, to form the waveguide component 100. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers 101 and 102 may go through a process of cleaning or etching for contaminant removal and a process of applying one or more coatings to assist in producing a gap-free and void-free joint between respective layers. Thereafter, the layers may be bonded together. In some embodiments where layers are only mechanically clamped, the waveguide components may be disassembled and reassembled as needed.

Figure 2A:
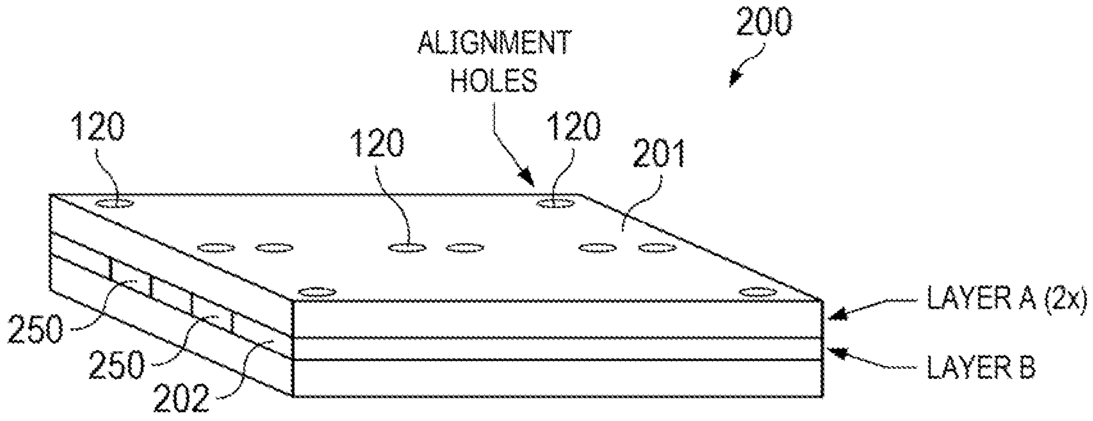
FIGS. 2A-2C illustrate an example multi-port waveguide coupler made using layered fabrication designs, techniques and processes, in accordance with some embodiments of the present invention.
Figure 2B:
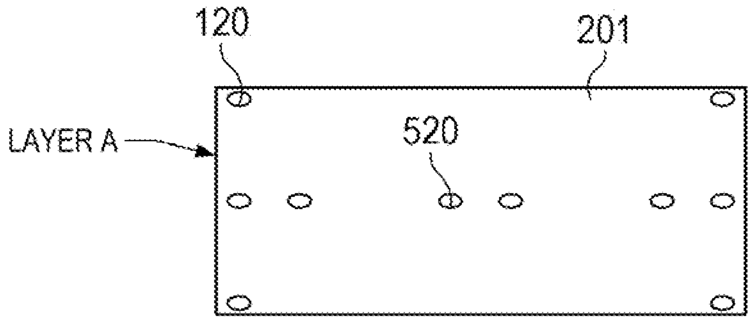
Figure 2C:
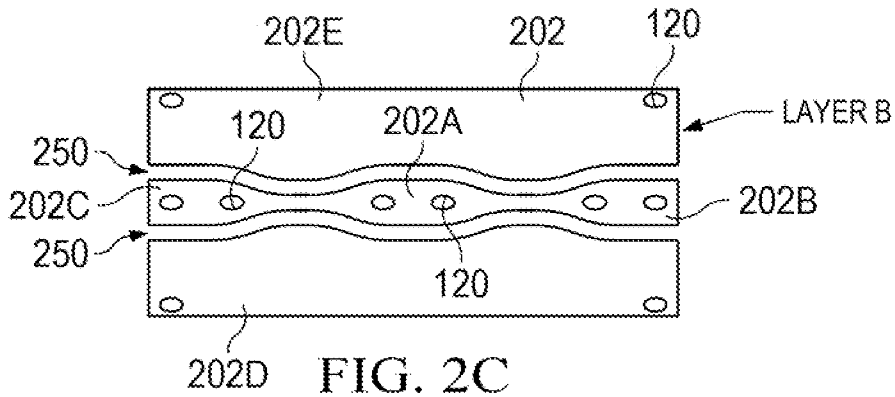

FIGS. 2A-2C illustrate an example multi-hole waveguide coupler 200 made using layered fabrication designs, techniques and processes, in accordance with some embodiments of the present invention. As shown in FIG. 2A, waveguide coupler 200 includes two non-channel layers 201 and one channel layer 202. Layers 201 and 202 may include conductive and/or nonconductive material. Layers 201 and 202 may be fabricated and assembled using techniques similar to those described with respect to FIGS. 1A-1C.

As shown in FIG. 2B, non-channel layers 201 may include generally solid layers. As stated above, in some embodiments, a "solid" layer may have non-channel portions removed such as for alignment features 120. As shown in FIG. 2C, the channel layer 202 has two waveguide channels. Channel layer 202 may have a thickness equal to the desired interior waveguide channel height. As stated above, layer 202 may include multiple identical layers of reduced thickness, such that the total thickness of the layers form the waveguide height. In some embodiments, the channels may be formed by removing material from solid layers.

As shown in FIGS. 2A-2C, alignment features 120 (shown as round although other shapes and/or combinations of shapes are also possible) may be formed in each layer 201 and 202. As indicated above, the alignment features 120 may include holes configured to receive alignment pins (not shown). Although not shown, additional alignment features 130, such as the rectangular alignment features shown in FIGS. 1A-1C, may also be formed in layers 201 and 202, and/or in sections of a layer, e.g., layer 102. For example, sections 202A-202C of layer 202 may include round features and sections 202D and 202E may include square features. The dimensions of each layer 201 and 202 (including of the channels) may be chosen to achieve desired performance characteristics. Alignment features 120 may be located to align the layers and sections of a layer appropriately when stacked to form monolithic multi-hole waveguide coupler 200, e.g., when stacking layer A, then the sections of layer B, and then another layer A.

The non-channel layers 201 and channel layer 202 may be secured (e.g., bonded) together to form the waveguide coupler 200. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers may go through a process of cleaning or etching for contaminant removal and a process of applying one or more coatings to assist in producing a gap-free and void-free joint between respective layers. Thereafter, the layers may be bonded together. Because the layers are assembled as disclosed herein, the waveguide components may be disassembled and reassembled as needed.

Figure 3A:
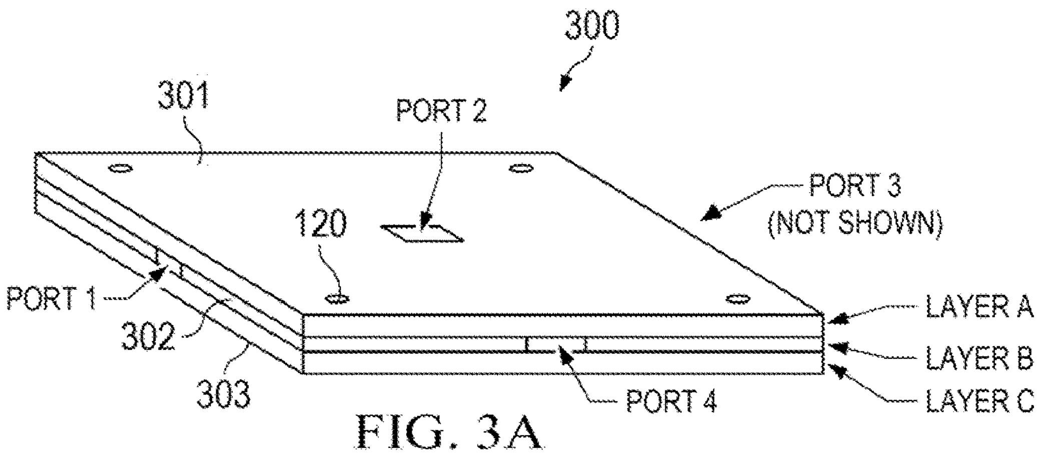
FIGS. 3A-3D illustrate an example tee-type waveguide coupler made using layered fabrication designs, techniques and processes, in accordance with some embodiments of the present invention.
Figure 3B:
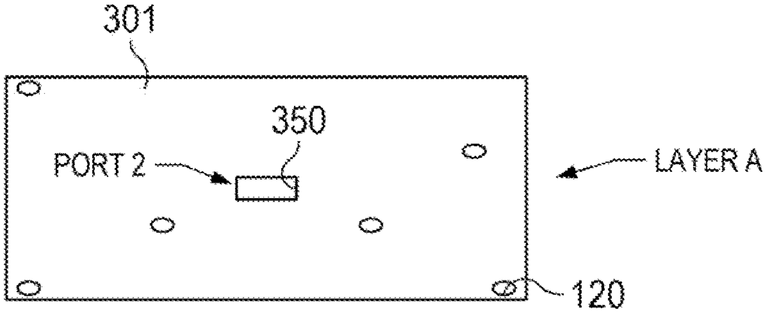
Figure 3C:
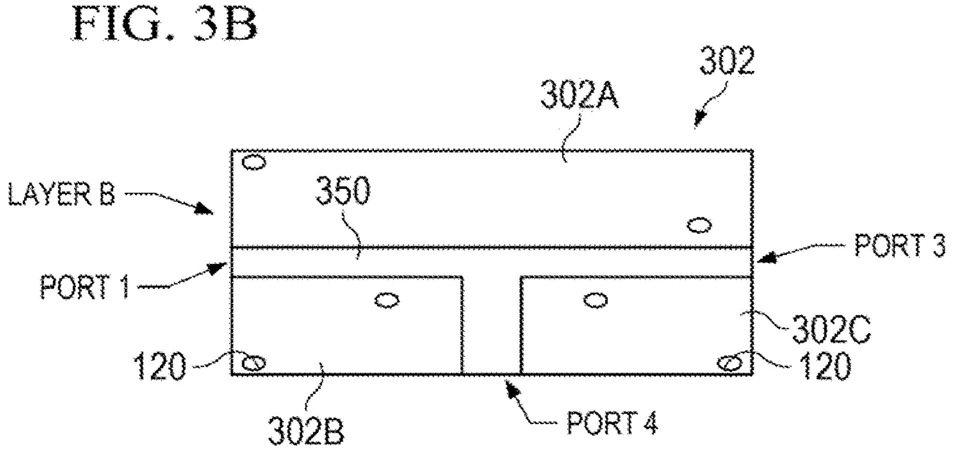
Figure 3D:
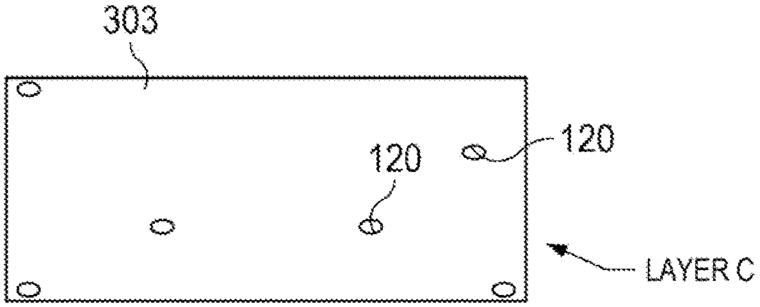

FIGS. 3A-3D illustrate an example tee-type waveguide coupler 300 made using layered fabrication designs, techniques and processes, in accordance with some embodiments of the present invention. As shown in FIG. 3A, the tee-type waveguide coupler 300 includes three layers 301, 302 and 303. Each of layer 301, layer 302, and layer 303 are fabricated and then stacked to form tee-type waveguide coupler 300. The layers 301-303 may include conductive and/or nonconductive material. FIG. 3B illustrates top layer 301 having a port 2 and channel portion 350 through its thickness. FIG. 3C illustrates channel layer 302, having a t-shaped channel portion 350 to ports 1, 3 and 4. FIG. 3D illustrates bottom layer 303 with no channel or ports.

In some embodiments, channel layer 302 has a thickness equal to the desired interior waveguide channel height. As stated above, channel layer 302 may include multiple identical layers of reduced thickness, such that the total thickness of the layers form the waveguide height. The channel portion 350 through the thickness of layer 301 connects to t-shaped channel portion 350 of layer 302. As discussed, these channel portions 350 may be formed through removal of material from the layers.

Alignment features 120, which may be round or other shape, may be formed in each layer 301, 302 and 303. Rectangular or other shaped alignment features 130 may alternatively or additionally be formed on each of the layers or layer sections. The dimensions of the layers 301-303 may be chosen to achieve the desired coupling between waveguides. The thickness of layer 302 may be designed to be the waveguide height, and one of the dimensions of the removed region 350 on layer 302 may correspond to the waveguide width. In some embodiments, the sections of a single layer may be formed separately, rather than through removal of material. In some embodiments, the channel 350 need not create separate sections. In other words, the thickness of layer 302 may be thicker than the intended height of the waveguide channel. Material removal therefore may leave a floor that retains the thicker sections 302A, 302B and 302C together.

The layers 301-303 are secured or bonded together to form a waveguide coupler 300. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers may go through a process of cleaning or etching for contaminant removal and a process of applying one or more coatings to assist in producing a gap-free and void-free joint between respective layers. Thereafter, the layers may be bonded together. Because the layers are assembled as disclosed herein, the waveguide components may be disassembled and reassembled as needed.

Figure 4A:
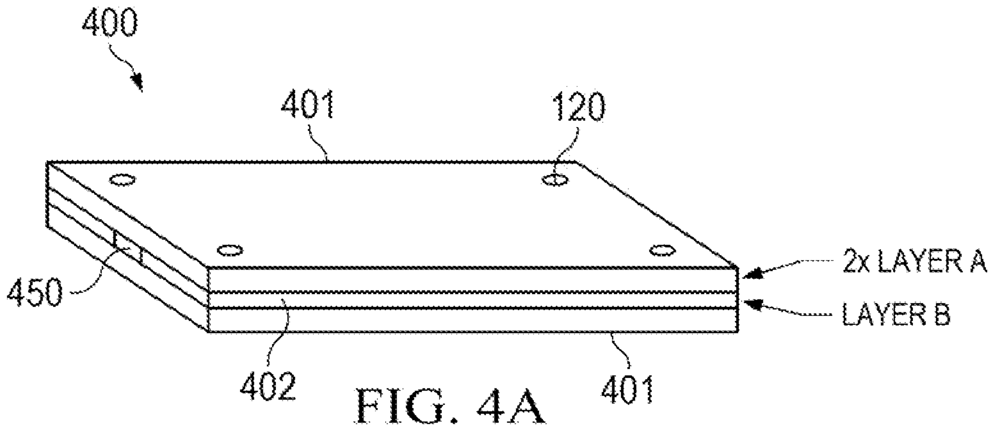
FIGS. 4A-4C illustrate an example waveguide filter made using layered fabrication designs, techniques and processes, in accordance with some embodiments of the present invention.
Figure 4B:
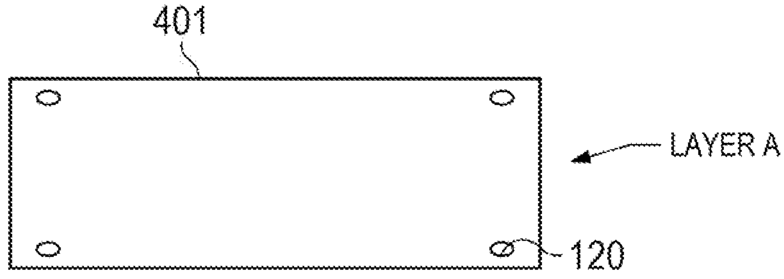
Figure 4C:
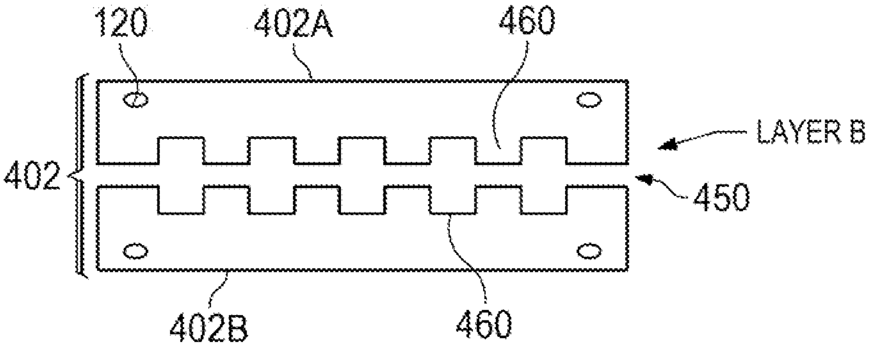

FIGS. 4A-4C illustrates an example waveguide filter 400 formed using layered fabrication designs, techniques and processes, in accordance with some embodiments of the present invention. As shown in FIG. 4A, the waveguide filter 400 includes two non-channel layers 401 and one channel layer 402. Non-channel layers 401 and channel layer 402 may include conductive and/or nonconductive material. FIG. 4B illustrates non-channel layer 401. FIG. 4C illustrates channel layer 402.

Channel layer 402 may have a thickness equal to the desired interior waveguide height. As stated above, channel layer 402 may include multiple identical layers of reduced thickness, such that the total thickness of the layers form the waveguide height. Channel layer 402 may be fabricated by removing material from a solid layer to form waveguide path 450, as well as a repeating features 460 configured to provide a filter-like response across the desired operating frequency. The process of choosing dimensions for these features to achieve a desired RF performance can be found in standard references and textbooks.

Alignment features 120, which may include alignment holes, e.g., round, rectangular or other shape or combination of shapes, may be formed in each non-channel layer 401 and channel layer 402 to ensure all layers and sections are aligned when stacked and bonded.

The non-channel layers 401 and channel layer 402 may be secured and/or bonded together to form the waveguide filter 400. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers may go through a process of cleaning or etching for contaminant removal and a process of applying one or more coatings to assist in producing a gap-free and void-free joint between respective layers. Thereafter, the layers may be bonded together. Because the layers are assembled as disclosed herein, the waveguide components may be disassembled and reassembled as needed.

Figure 5A:
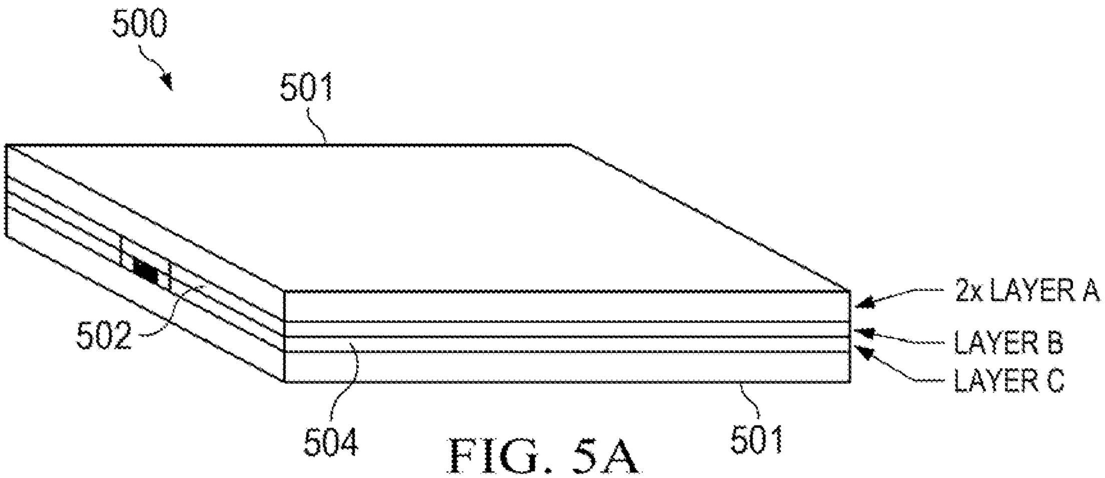
FIGS. 5A-5F illustrate an example waveguide phase shifter made using layered fabrication designs, techniques and processes, in accordance with some embodiments of the present invention.
Figure 5B:
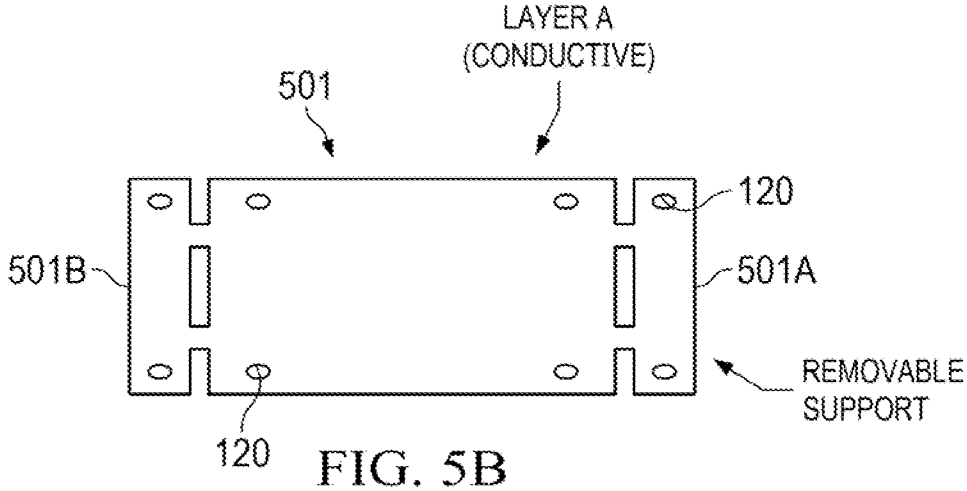
Figure 5C:
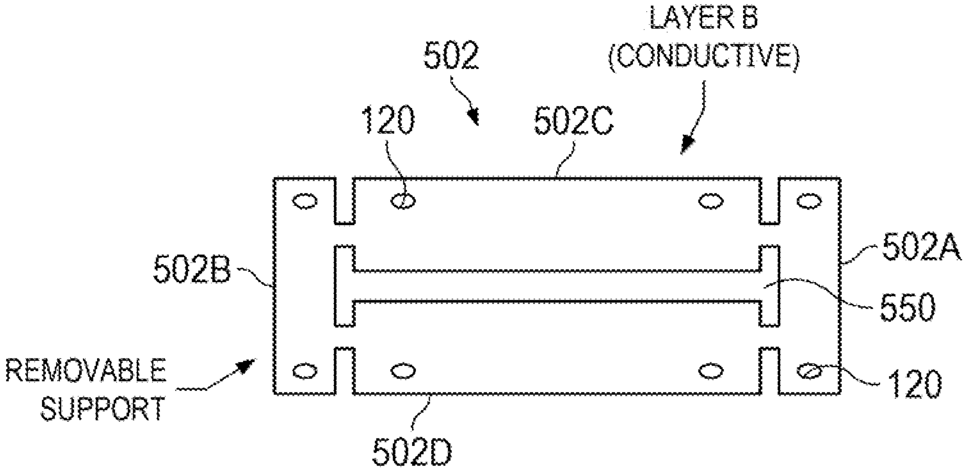
Figure 5D:
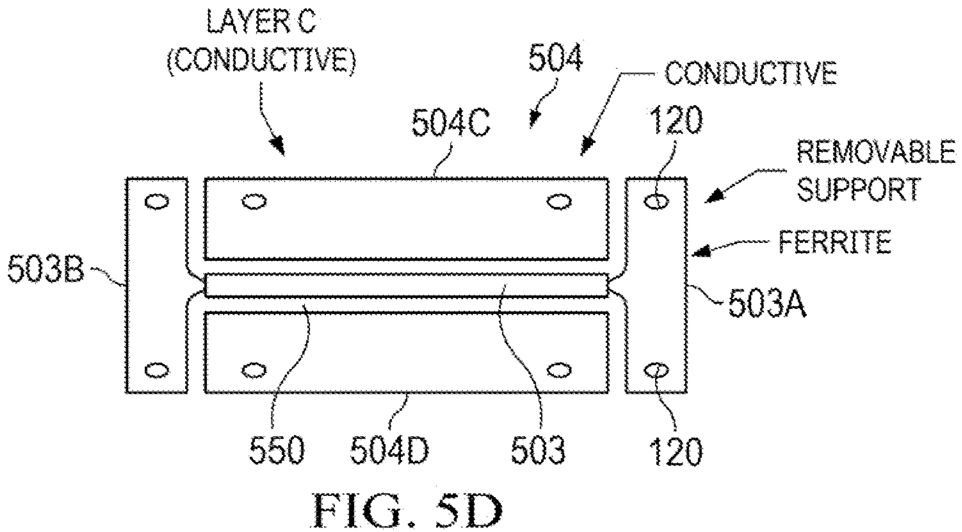
Figure 5E:
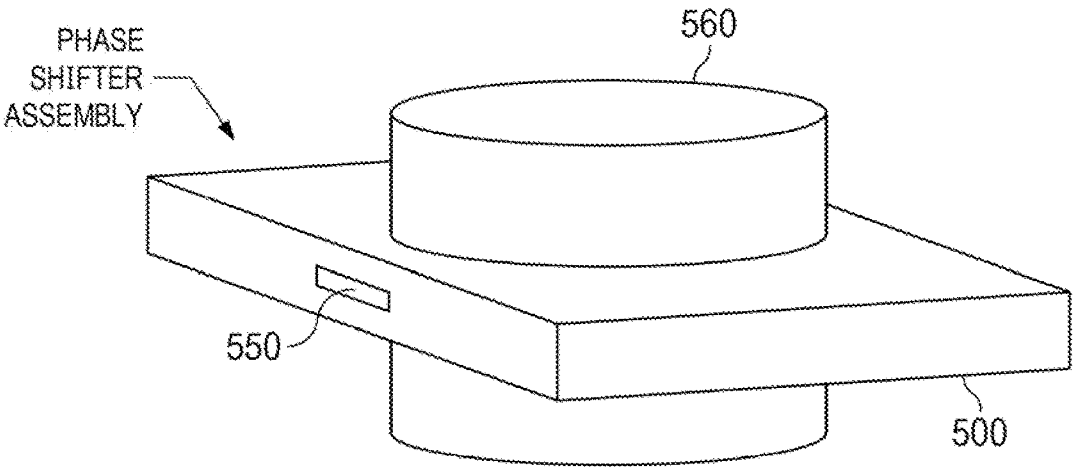
Figure 5F:
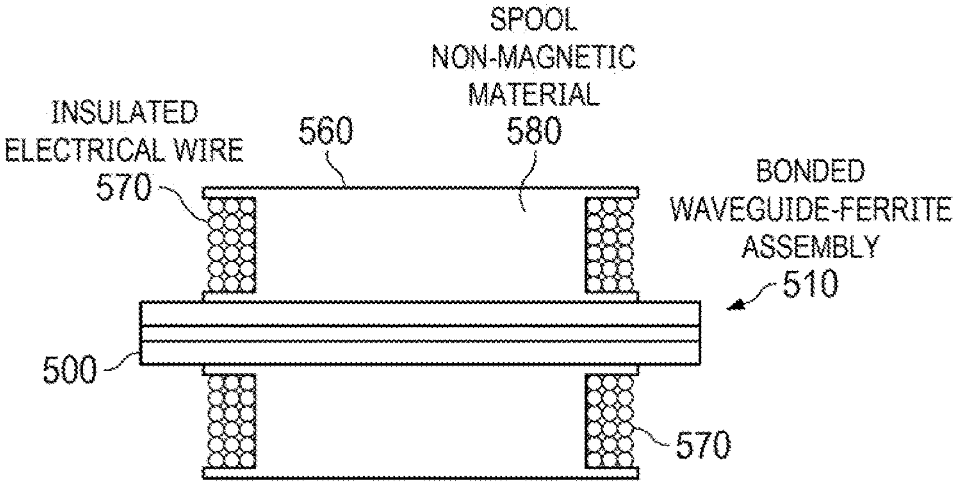

FIGS. 5A-5F show an example waveguide phase shifter 500 formed using layered fabrication designs, techniques and processes, in accordance with some embodiments of the present invention. As shown in FIG. 5A, waveguide phase shifter 500 includes top and bottom layers 501, open channel layer 502 and ferrite channel layer 504. FIG. 5B illustrates top or bottom layer 501. FIG. 5C illustrates open channel layer 502. FIG. 5D illustrates ferrite channel layer 504. FIG. 5E illustrates a bonded waveguide ferrite assembly 510, including a magnetic field producing element 560 positioned on the external surfaces of the top and bottom layers 501 of the waveguide phase shifter 500. FIG. 5F illustrates details of the bonded waveguide ferrite assembly 510, including a magnetic field producing element 560 positioned over the external surfaces of the top and bottom layers of the waveguide phase shifter 500.

Top and bottom layers 501 and open channel layer 502 may include conductive and/or non-conductive materials. As shown in FIGS. 5B, 5C and 5D, each of top and bottom layers 501, open channel layer 502, and ferrite channel layer 504 include removable supports each with its own alignment feature or features 120. Each removable support is a portion of the layer 501, 502, 504 removably coupled to the main body through one or more bridges. Top and bottom layers 501 include removable supports 501A and 501B. Open channel layer 502 includes removable supports 502A and 502B. Ferrite channel layer 504 includes removable supports 503A and 503B. The bridges are preferably small to allow the associated removable support to be removed during assembly.

As shown in FIG. 5D, the ferrite channel layer 504 includes three sections, namely, the ferrite section 503 and the two side sections 504C and 504D of conductive material. To assemble the waveguide phase shifter 500, top and bottom layers 501, open channel layer 502, and ferrite channel layer 504 are fabricated (including with their respective removable supports 501A and 501B; 502A and 502B; and 503A and 503B; channels 550 and alignment features 120. The top and bottom layers 501, open channel layer 502, and ferrite channel layer 504 are then stacked as shown in FIG. 5A.

As shown in FIG. 5A, open channel layer 502 may have a thickness equal to the desired interior waveguide channel height. As stated above, channel layer 502 may include multiple identical layers of reduced thickness, such that the total thickness of the layers form the waveguide height. Open channel layer 502 and ferrite channel layer 504 may have channels removed. Alignment features 120 may be disposed in each of top and bottom layers 501, open channel layer 502, and ferrite channel layer 504 (including in ferrite section 503). The dimensions of each layer 501, 502, 504 may be chosen to achieve desired performance characteristics. The alignment features 120, including those in the removable supports, ensure that all layers and respective features align when assembled.

The layers 501, 502, 504 (including ferrite section 503) are secured, e.g., bonded, together. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers may go through a process of cleaning or etching for contaminant removal and a process of applying one or more coatings to assist in producing a gap-free and void-free joint between respective layers. Thereafter, the layers may be bonded together. Because the layers are assembled as disclosed herein, the waveguide components may be disassembled and reassembled as needed.

After stacking, assembling, and bonding, each removable support may be removed.

As shown in FIGS. 5E and 5F, a magnetic field producing element 560 may be added on the external surfaces of the top and bottom layers 501 to form the waveguide phase shifter 500. As shown in FIG. 5F, the magnetic field producing element 560 may include an insulated wire 570 wrapped around a non-magnetic "spool". Passing a current through the wire 570 will cause a magnetic field to be created in the vertical direction, biasing the ferrite in the ferrite section 503, and changing the electrical phase length from one waveguide port to the other. The magnetic field could alternatively be provided by permanent magnets.

The waveguide phase shifter 500 can be combined with couplers, such as those shown in FIGS. 3A-3D, to form a four-port waveguide circulator. The addition of absorptive loads on two of the ports makes the device a waveguide isolator. A similar approach can be taken to implement a three-port y-type waveguide circulator and isolator.

Figure 6A:
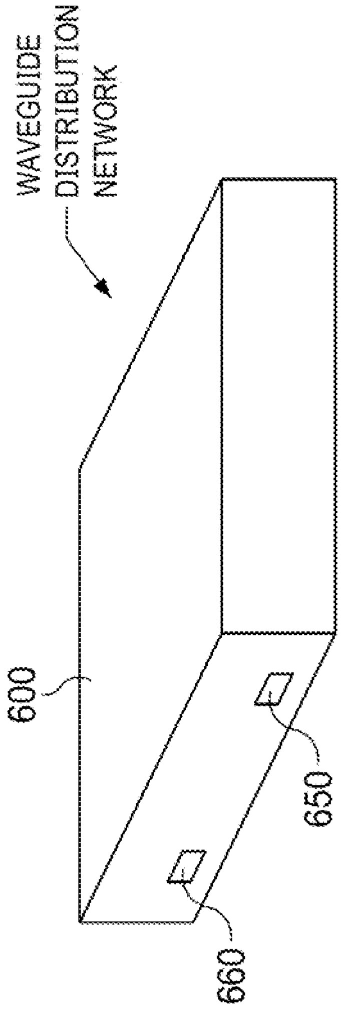
FIGS. 6A-6I illustrate an example waveguide distribution network made using layered fabrication designs, techniques and processes, in accordance with some embodiments of the present invention.

FIGS. 6A-6I illustrate an example waveguide distribution assembly 600 using layered fabrication designs, techniques and processes, in accordance with some embodiments of the present invention. As shown in FIG. 6A, the waveguide distribution assembly 600 includes two waveguide channels 660 and 650 that will be seen crossing over each other internally. Although not shown in FIG. 6A, the waveguide distribution assembly 600 is fabricated using multiple layers.

Figure 6B:
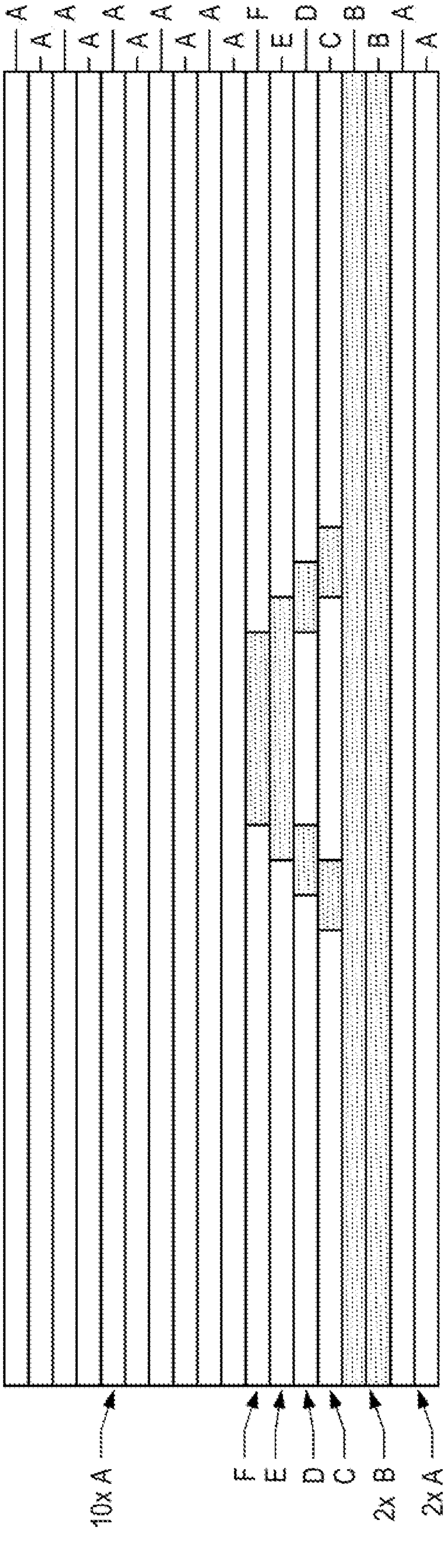

FIG. 6B illustrates a cross-sectional side view of the waveguide distribution assembly 600. As shown in FIG. 6B, the waveguide channel 660 travels across the waveguide distribution assembly 600 "horizontally" without ascension (routing up through layers) or descension (routing down through layers) and possibly only through in a single layer. The waveguide channel 650 travels across the waveguide distribution assembly 600 while ascending and descending through higher layers to go over waveguide channel 660.

Figure 6C:
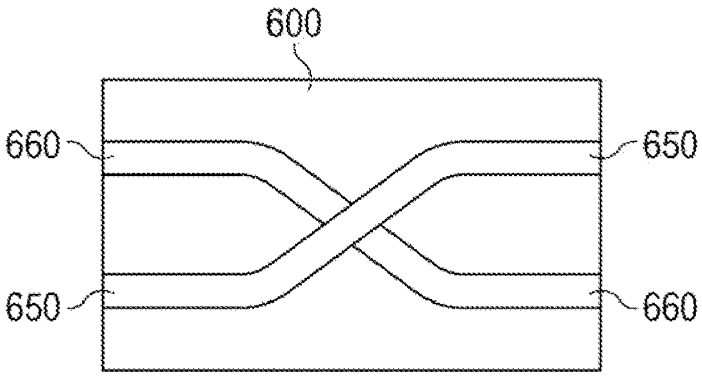

FIG. 6C illustrates a cross-sectional top view of the waveguide distribution assembly 600. As shown in FIG. 6C, the waveguide channel 660 travels across the waveguide distribution assembly 600 in an "S" curve from the back section to the front section, and the waveguide channel 650 travels across the waveguide distribution assembly 600 in an "S" curve from the front section to the back section. As shown, the waveguide channel 660 is below the waveguide channel 650, as the waveguide channel 650 is routed through higher layers over the waveguide channel 660 and then routed down through lower layers, possibly although not necessarily back to the same layer from which it started. As shown, the waveguide channel ports may be disposed on opposite sides of the waveguide distribution assembly 600.

Figure 6D:
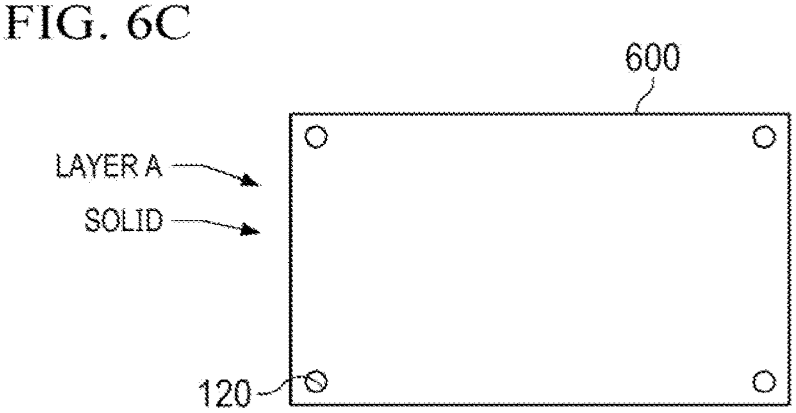
Figure 6E:
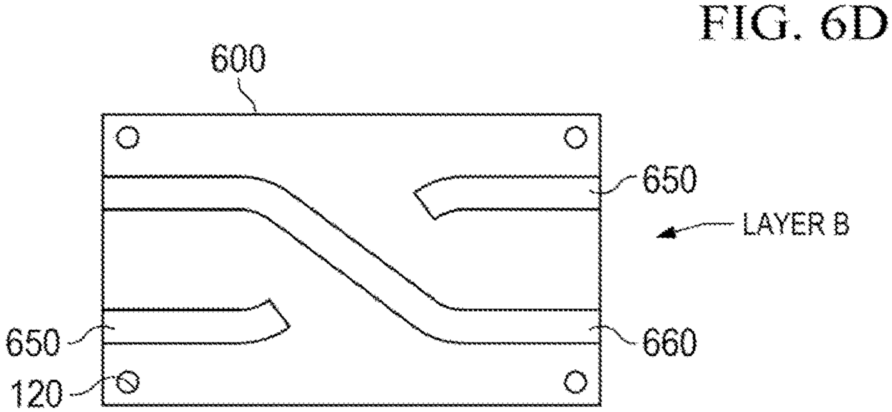
Figure 6F:
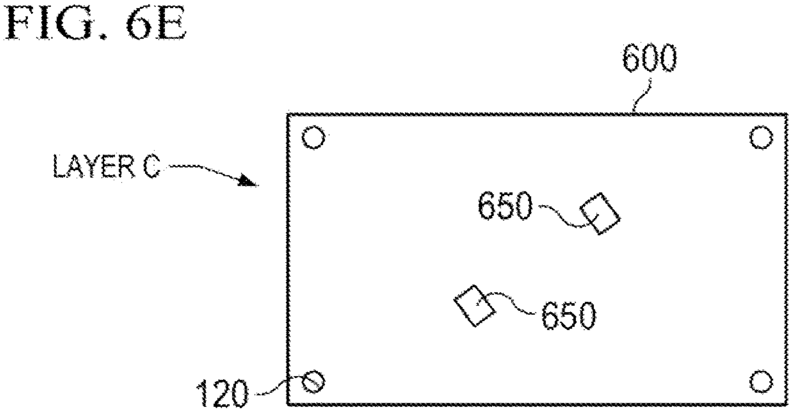
Figure 6G:
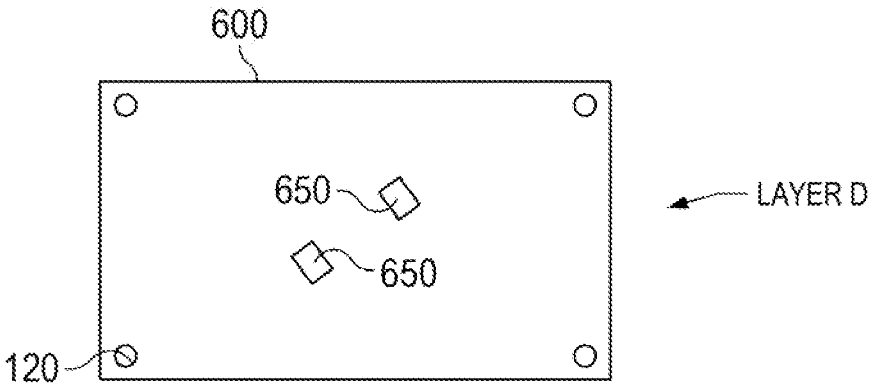
Figure 6H:
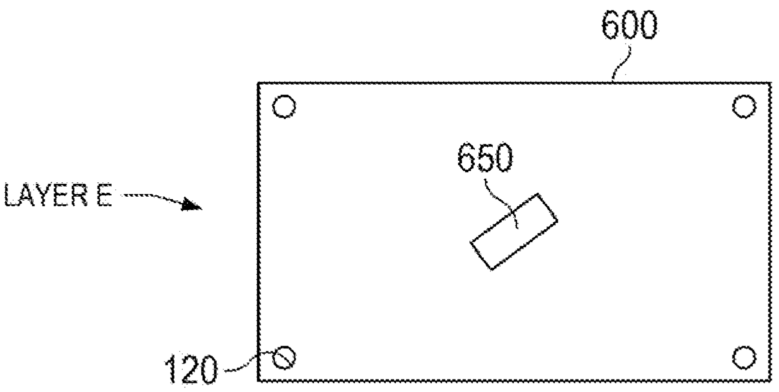
Figure 6I:
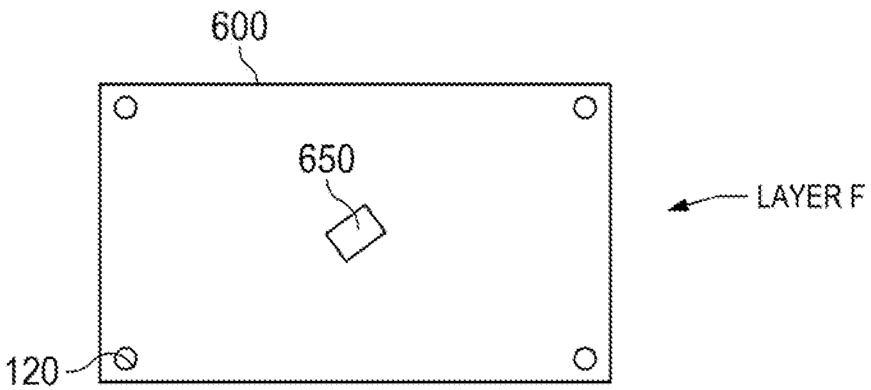

FIG. 6D illustrates a non-channel layer A. FIG. 6E illustrates a layer B with channel 660 and a portion of channel 650. FIG. 6F illustrates a layer C with a first elevated portion of channel 650 as channel 650 is routed upwards above layer B. FIG. 6G illustrates a layer D with a second elevated portion of channel 650 as channel 650 is routed above layer C. FIG. 6H illustrates a layer E with a third elevated portion of channel 650 as channel 650 is routed above layer D. FIG. 6I illustrates a layer F with a fourth elevated portion of channel 650 as channel 650 is routed above layer E. The assembly of layers A-E are shown in FIG. 6B. Notably, the thickness of each layer need not be identical in order to create smoother transitions (smaller steps) as a channel elevates across the layers. The individual layers of the waveguide distribution assembly 600 may be formed, stacked, and secured (e.g., bonded).

This example shows that the techniques allow an arbitrary number of waveguide channels to be routed through an assembly in a similar way to how signals are routed on single conductors or on stripline in printed circuit boards. Increasing the number of layers will likely increase routing complexity, however with minimal change in manufacturing complexity. The step features that occur when transitioning between layers will affect the RF characteristics. Standard techniques known to those skilled in the art of RF design can account for these effects to produce the desired RF characteristics for the waveguide distribution assembly 600.

The alignment features 120 ensure that all layers and respective features align when assembled. The layers may be secured, e.g., bonded, together. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers may go through a process of cleaning or etching for contaminant removal and a process of applying one or more coatings to assist in producing a gap-free and void-free joint between respective layers. Thereafter, the layers may be bonded together. Because the layers are assembled as disclosed herein, the waveguide components may be disassembled and reassembled as needed.

Figure 7A:
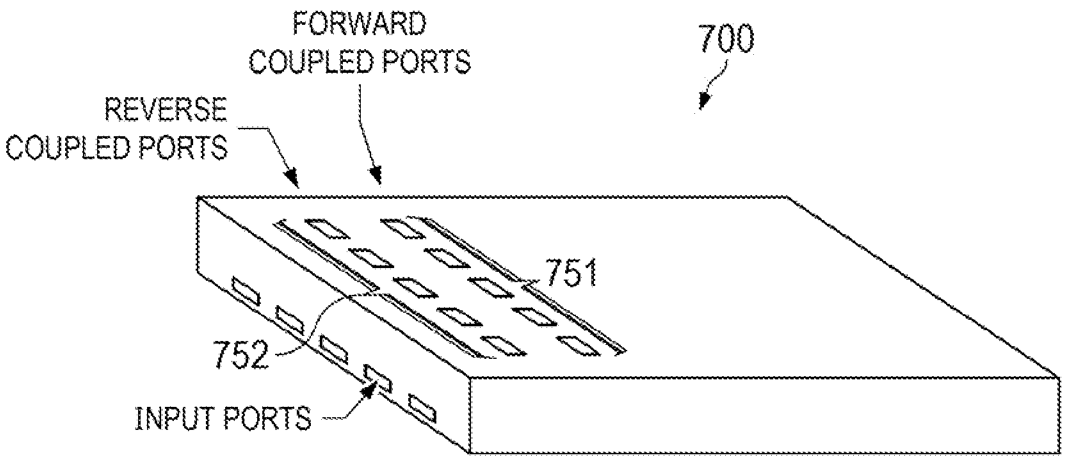
FIGS. 7A-7C illustrate an example waveguide distribution network with integrated couplers made using layered fabrication, in accordance with some embodiments of the present invention.
Figure 7B:
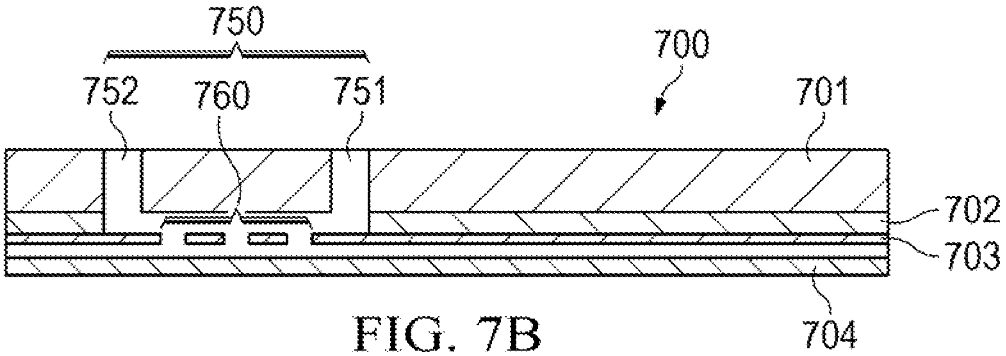
Figure 7C:
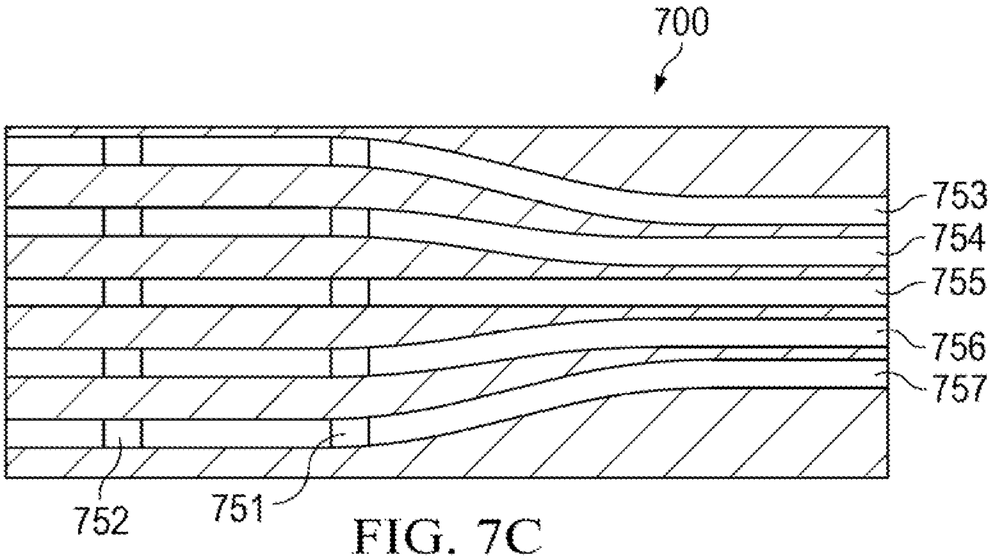

FIGS. 7A-7C illustrate an example waveguide distribution assembly 700 (having integrated couplers) made using layered fabrication designs, techniques and processes, in accordance with some embodiments of the present invention. As shown in FIG. 7A, the waveguide distribution assembly 700 includes a set of input ports (shown in FIG. 7C on a front surface, a set of forward coupled ports 751 on a top surface, and a set of reverse coupled ports 752 on the top surface.

FIG. 7B illustrates a cross-sectional side view of the waveguide distribution assembly 700 through one of the input ports, one of the forward coupled ports 751 and one of the reverse coupled ports 752. As shown, waveguide distribution assembly 700 includes layers 701-704. Layer 704 includes a non-channel base layer. Waveguide channel is positioned between layer 704 and layer 703. Layer 703 includes irises 760 to enable a travelling wave to exit the waveguide channel upward through the layer 703 to layers 702 and 702, which form forward and reverse channels to the forward and reverse coupled ports 751 and 752, respectively.

FIG. 7C illustrates a cross-sectional top view of the waveguide distribution assembly 700 through the input ports, forward coupled ports 751 and reverse coupled ports 752. As shown, the waveguide distribution assembly 700 includes five waveguide channels 753-757. The waveguide channels 753-757 are formed from layers 701-704, and may be made of conductive material and/or non-conductive, e.g., by section removal.

Each waveguide channel 753-757 passes through a coupler section 750, which is formed from the series of irises 760 in the layer 703 directly above the through waveguide. Above the irises 760, the coupled section 750 is formed from more conductive layers 702 and 701 with material appropriately removed. Features chosen by conventional RF design techniques may be included in layers 701, 702, and 703 at the time of layer fabrication to provide proper RF characteristics such as return loss, insertion loss, and directionality. The forward and backward power coupled ports 751 and 752 are formed in the top layer 701. The individual layers 701-704 of assembly 700 may be formed, stacked, and secured using the bonding techniques employed in any of the herein disclosed waveguide components.

As disclosed herein, the example waveguide components may be quickly and precisely formed using stacked layers with co-registered alignment features (round, square, rectangular and/or other shape) and corresponding alignment pins. The stacked layers may be conductive, non-conductive, or a combination of conductive and non-conductive. Waveguide paths may be formed in one or more layers by precise machining (e.g., material removal), which may be performed under control of a suitably programmed processor. The paths may be sized to achieve component performance for a range of electromagnetic frequencies. The layers may be assembled, aligned and secured. Because the layers are assembled as disclosed herein, the waveguide components may be disassembled and reassembled as needed.

Some of the features shown across figures, such as alignment pins 120, perform the same or similar functions in those examples.

The layers may be secured, e.g., bonded, together. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers may go through a process of cleaning or etching for contaminant removal and a process of applying one or more coatings to assist in producing a gap-free and void-free joint between respective layers. Thereafter, the layers may be bonded together. Because the layers are assembled as disclosed herein, the waveguide components may be disassembled and reassembled as needed.

FIGS. 8A-8D illustrate a waveguide component 800 configured to be coupled to other waveguide components, made using layered fabrication designs, techniques and processes, in accordance with some embodiments of the present invention.

Figure 8A:
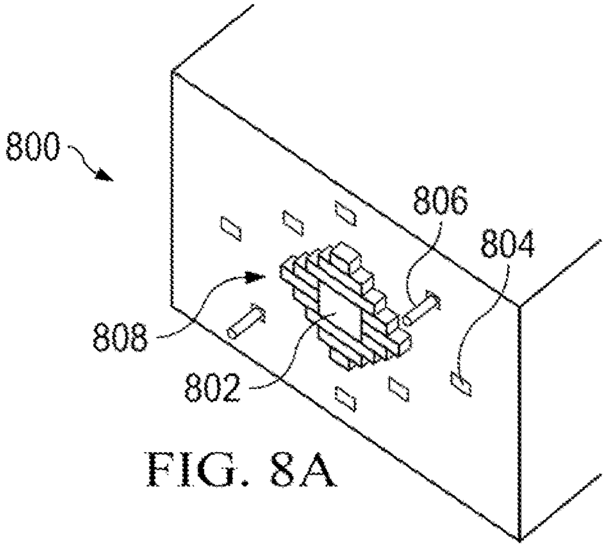
FIGS. 8A-8D illustrate a waveguide component configured to couple to other waveguide components, made using layered fabrication designs, techniques and processes, in accordance with some embodiments of the present invention.

FIG. 8A illustrates a perspective view of a waveguide component 800 with a waveguide port 802 on the front face of the waveguide component 800. As shown, the waveguide port 802 may include a waveguide opening on a surface perpendicular to the waveguide propagation direction, and may include a boss 808 framing it. Additional features can be included to simplify use of the waveguide component. Component alignment features (e.g., holes 804 and pins 806) can be included in the layers. The holes 804 can receive the pins 806. The pins 806 can be pressed into near-fit holes 804, or secured through other means (brazing, soldering, epoxy, etc.). The pins 806 can be used to align the waveguide component 800 to a mating waveguide component. The holes 804 can also be included to receive pins 806 on mating waveguide components. The holes 804 can be included to allow for attachment of waveguide components by bolts. The holes 804 can serve as pilot features to provide an accurate position to drill and tap, or to apply a threaded insert. Standard waveguide flanges have been designed by various bodies. The use of these features allows waveguide components to be fabricated that will interface with standard flanges.

Figure 8B:
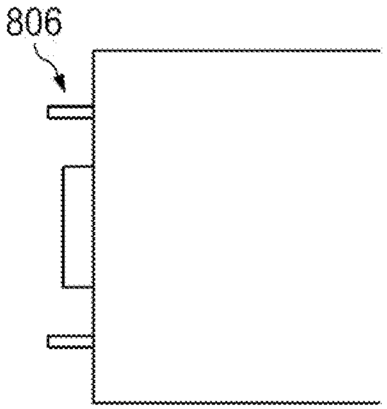
Figure 8C:
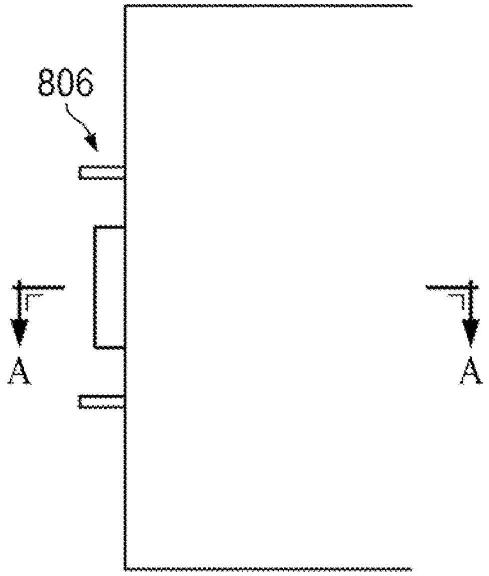
Figure 8D:
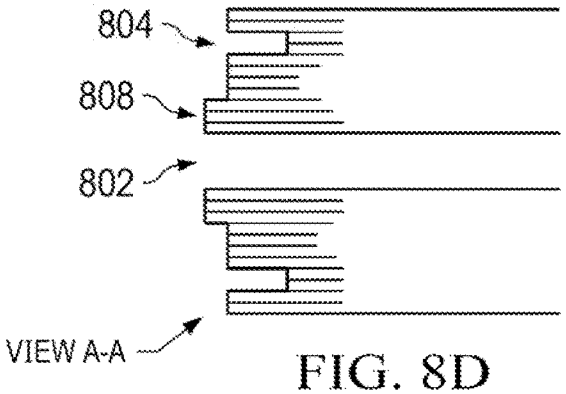

FIG. 8B illustrates a top view of the waveguide component 800, including the pins 806 extending from the front face. FIG. 8C illustrates the top view of the waveguide component 800 and identifying a cross-section A-A. FIG. 8D illustrates a cross-sectional side view of the waveguide component 800, showing a series of layers forming the holes 804, the waveguide port 802, and the framing 808.

For waveguide components that require hermeticity, features can be included on the waveguide port face to accept an elastomer "o-ring", allowing a hermetic seal between this waveguide component and the mating waveguide components.

FIGS. 9A-9I illustrate a waveguide height transformer 900 made using layered fabrication designs, techniques and processes, in accordance with some embodiments of the present invention.

Figure 9A:
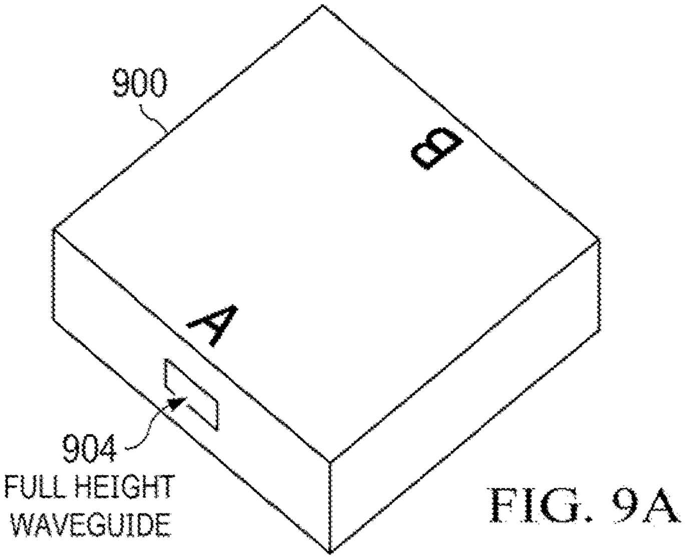
FIGS. 9A-9I illustrate a waveguide height transformer 900 made using layered fabrication designs, techniques and processes, in accordance with some embodiments of the present invention.
Figure 9B:
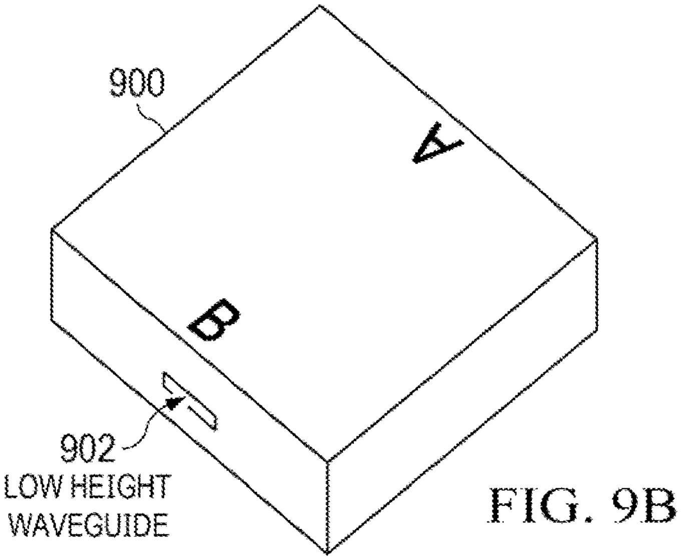
Figure 9C:
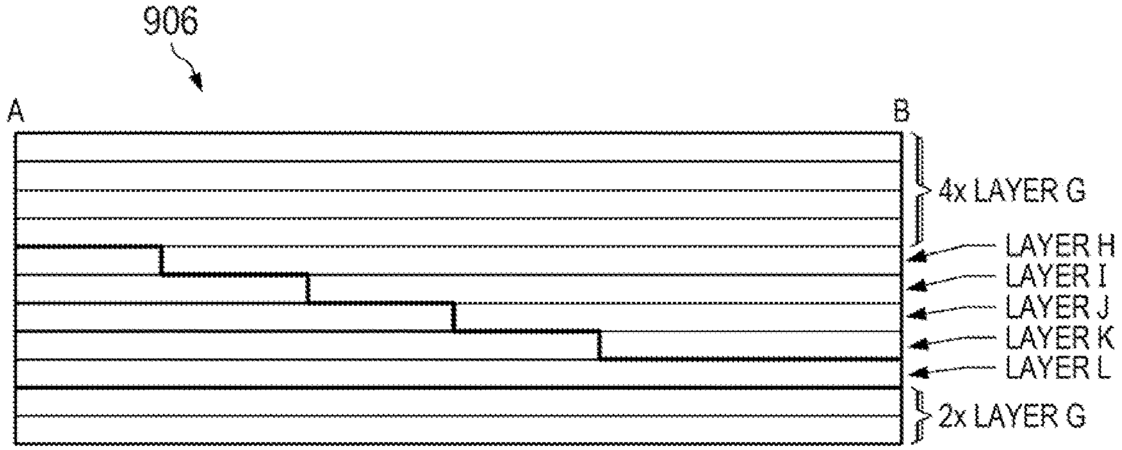

As shown in FIGS. 9A and 9B, waveguide height transformer 900 includes a low-height waveguide port 902 and a full-height (standard) waveguide port 904. As shown in FIG. 9C, the layers G, H, I, J, K, L as assembled form a waveguide height transformer 906 to transition from the full-height waveguide port 904 to the low-height waveguide port 902. In one example, the standard waveguide is WR-10 waveguide, with width of 0.1 inch and height of 0.05 inch. The low height waveguide has the same width at WR-10 (0.1 inch), but the height is reduced to 0.01 inch. This transition is achieved by a number of steps, formed into the series of layers.

Figure 9D:
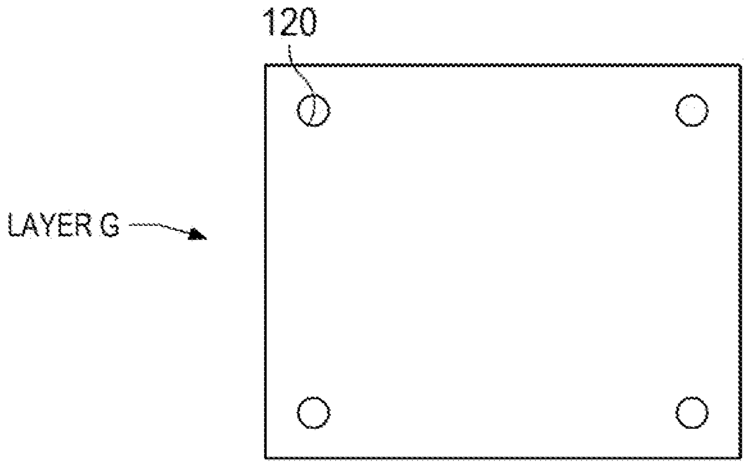
Figure 9E:
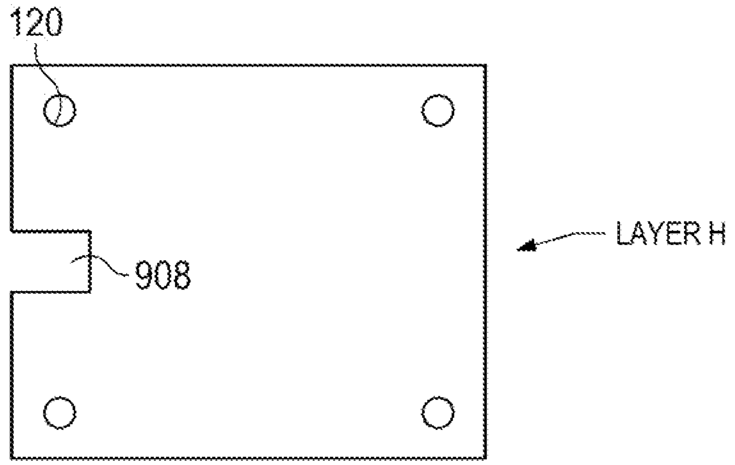
Figure 9F:
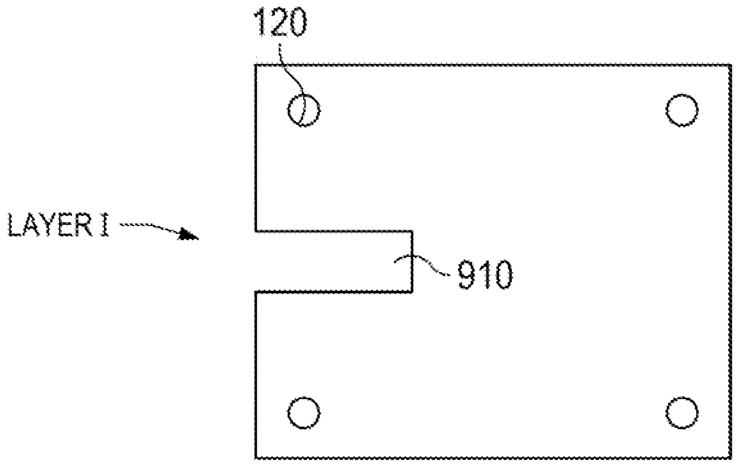
Figure 9G:
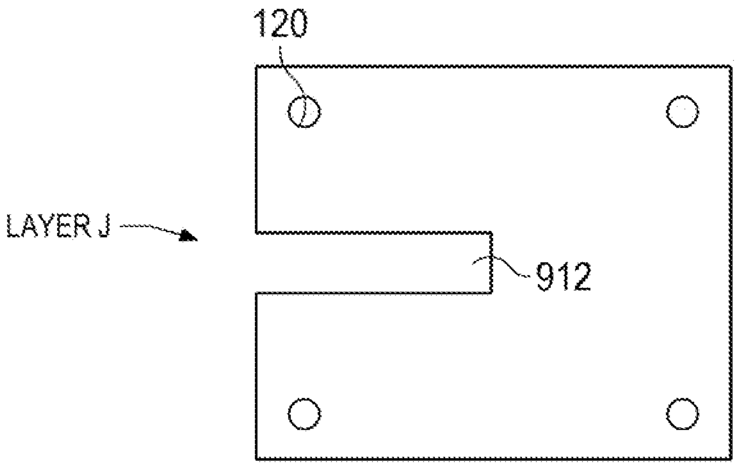
Figure 9H:
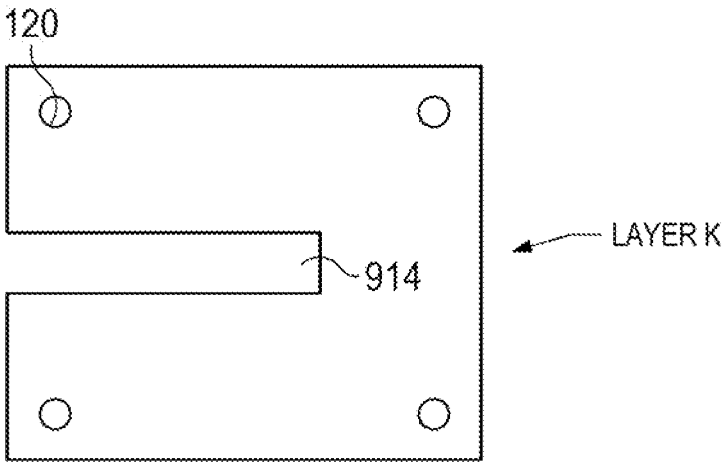
Figure 9I:
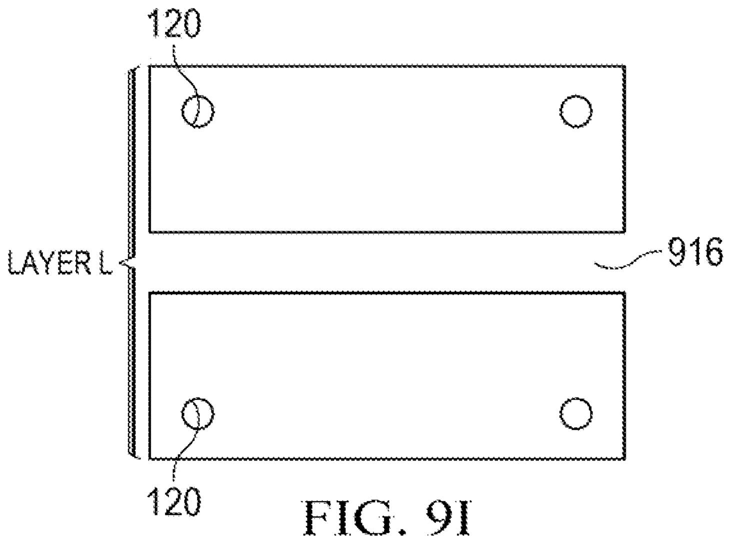

FIG. 9D illustrates layer G as a non-channel layer with alignment features 120. FIG. 9E illustrates layer H as a non-channel layer with a first segment 908 removed to form a first segment of waveguide channel 906. FIG. 9F illustrates layer I as a non-channel layer with a second segment 910 (longer than the first segment 908) removed to form a second segment of waveguide channel 906. FIG. 9G illustrates layer J as a non-channel layer with a third segment 912 (longer than the first segment 910) removed to form a third segment of waveguide channel 906. FIG. 9H illustrates layer K as a non-channel layer with a third segment 914 (longer than the first segment 912) removed to form a fourth segment of waveguide channel 906. FIG. 9I illustrates layer L as a non-channel layer with a segment 916 (entirely across the layer L) removed to form the bottom segment of waveguide channel 906. Each of layers H, I, J, K and L also include alignment features 120 to assist with assembling the layers together to form the waveguide height transformer 900.

The individual layers 701-704 of waveguide height transformer 700 may be formed, stacked, and secured using the bonding techniques employed in any of the herein disclosed waveguide components.

As disclosed herein, the example waveguide components may be quickly and precisely formed using stacked layers with co-registered alignment features (round, square, rectangular and/or other shape) and corresponding alignment pins. The stacked layers may be conductive, non-conductive, or a combination of conductive and non-conductive. Waveguide paths may be formed in one or more layers by precise machining (e.g., material removal), which may be performed under control of a suitably programmed processor. The paths may be sized to achieve component performance for a range of electromagnetic frequencies. The layers may be assembled, aligned and secured, e.g., bonded. Bonding the layers together assists in establishing intimate contact therebetween to make the final assembly equivalent or identical to a part fabricated from one or more solid blocks of metal using a conventional process. The bonding can be performed through various well known techniques that involve the application of some combination of increased pressure and temperature for an appropriate time. As indicated above, prior to assembly, layers may go through a process of cleaning or etching for contaminant removal and a process of applying one or more coatings to assist in producing a gap-free and void-free joint between respective layers. Thereafter, the layers may be bonded together. Because the layers are assembled as disclosed herein, the waveguide components may be disassembled and reassembled as needed.

Some of the features shown across figures, such as alignment features 120, perform the same or similar functions in those examples.

In some embodiments, some designs may avoid the need for alignment features 120 for some layers or some sections of layers. For example, a section can be seated inside a "pocket" of a layer. For example, a metal layer may have a cut out in it (entirely through the layer forming a "hole" or only partially through the layer forming a "cavity"), and a dielectric of the same shape as the cut out may be placed therein. The dielectric will be aligned by the cut out. The shape may have a key or be designed to be self-aligning.

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:

1. An electromagnetic waveguide component, comprising:
- a plurality of planar layers comprising:
  - one or more layers shaped to accommodate at least a portion of a waveguide channel configured to transmit or manipulate an electromagnetic wave and configured to provide a desired radio frequency (RF) response;
  - one or more alignment features formed in each of the plurality of layers, the one or more alignment features in each of the plurality of layers configured to provide precise stacking registration among the plurality of planar layers, the one or more alignment features configured to cooperate with corresponding pins; and the plurality of planar layers when assembled into a stack configured to form the waveguide channel, at least one of the plurality of planar layers having formed thereon at least one removable support.

2. The electromagnetic waveguide component of claim 1, wherein one or more of the plurality of planar layers comprises a conductive material and a non-conductive material.

3. The electromagnetic waveguide component of claim 2, wherein one of more of the plurality of planar layers comprises a ferrite material.

4. The electromagnetic waveguide component of claim 1, wherein the plurality of planar layers are bonded to create seals hermetic to electromagnetic waves such that any loss and mismatch of the electromagnetic wave corresponds to that achieved from a solid piece of material.

5. The electromagnetic waveguide component of claim 1, wherein the plurality of planar layers are made of copper, aluminum, titanium, tungsten, iron, nickel, cupronickel, stainless steel, carbon steel, alloy steel, tool steel, iron-oxide based ferromagnetic materials, copper alloys, dispersion hardened copper, aluminum alloys or any combination thereof.

6. The electromagnetic waveguide component of claim 1, wherein the plurality of layers are made of multiple materials, including one or more of lossy dielectrics, non-lossy dielectrics, insulators, ferromagnetic materials, diamagnetic materials, and electrets.

7. The electromagnetic waveguide component of claim 1, wherein the electromagnetic waveguide component is a waveguide distribution assembly, routing one or more waveguide channels from an input port to an output port.

8. The electromagnetic waveguide component of claim 1, wherein the electromagnetic waveguide component is a waveguide distribution assembly, routing one or more waveguide channels from an input port to an output port and providing a coupler on one or more of the waveguide paths providing, at a coupled port, a portion of the signal in one of the one or more waveguide channels.

9. The electromagnetic waveguide component of claim 1, wherein the electromagnetic waveguide component is a coupler.

10. The electromagnetic waveguide component of claim 1, wherein the electromagnetic waveguide component is a phase shifter.

11. The electromagnetic waveguide component of claim 1, wherein the electromagnetic waveguide component is a circulator.

12. The electromagnetic waveguide component of claim 1, wherein the electromagnetic waveguide component is a load.

13. The electromagnetic waveguide component of claim 1, wherein the electromagnetic waveguide component is a filter.

14. The electromagnetic waveguide component of claim 1, wherein the electromagnetic waveguide component provides waveguide routing and coupling to one or more additional electromagnetic waveguide components.

15. The electromagnetic waveguide component of claim 1, wherein the one or more alignment features include alignment features of different types.

16. The electromagnetic waveguide component of claim 1, wherein at least one of the plurality of planar layers is separated into at least two sections, and each of the sections includes at least one alignment feature.

17. The electromagnetic waveguide component of claim 1, wherein each of the plurality of planar layers includes at least two alignment features.

18. The electromagnetic waveguide component of claim 1, wherein the waveguide channel is routed up or down different planar layers.

19. The electromagnetic waveguide component of claim 18, wherein the waveguide channel passes over or under a different waveguide channel.

* * * * *